US008421750B2

(12) United States Patent
Moritaku (10) Patent No.: US 8,421,750 B2
(45) Date of Patent: Apr. 16, 2013

(54) POINTING DEVICE, DATA PROCESSING DEVICE, AND DATA PROCESSING SYSTEM

(75) Inventor: Toshimitsu Moritaku, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 708 days.

(21) Appl. No.: 12/630,227

(22) Filed: Dec. 3, 2009

(65) Prior Publication Data

US 2010/0141577 A1 Jun. 10, 2010

(30) Foreign Application Priority Data

Dec. 4, 2008 (JP) ................................. 2008-309410
Nov. 27, 2009 (JP) ................................. 2009-270409

(51) Int. Cl.
*G06F 3/033* (2006.01)
(52) U.S. Cl.
USPC ............................ 345/157; 345/158; 345/162
(58) Field of Classification Search ........................ None
See application file for complete search history.

(56) References Cited

U.S. PATENT DOCUMENTS 5,554,980 A 9/1996 Hashimoto et al.
7,225,101 B2 5/2007 Usuda et al.
2004/0252102 A1* 12/2004 Wilson et al. ................. 345/156
2006/0109245 A1* 5/2006 Wilson et al. ................. 345/157
2007/0211026 A1* 9/2007 Ohta ............................. 345/158

FOREIGN PATENT DOCUMENTS

JP 7-219501 A 8/1995
JP 7-284166 A 10/1995
JP 2008-135075 A 6/2008

* cited by examiner

Primary Examiner — Adam R Giesy
(74) Attorney, Agent, or Firm — Global IP Counselors, LLP (57) ABSTRACT

A data processing device includes a cursor position decision unit, a display control unit, a switch operation signal detection unit, a storage unit, an event generation unit and an event execution unit. The storage unit is configured to store, for a predetermined period, at least one of cursor position information outputted from the cursor position decision unit and event information according to one of a plurality of selection options located in a displayed image at a position corresponding to the cursor position decided by the cursor position decision unit. The event generation unit is configured to generate an execution event when a first switch operation signal is detected at a first timing by the switch operation signal detection unit based on the at least one of the cursor position information and the event information stored in the storage unit at a second timing prior to the first timing.

8 Claims, 6 Drawing Sheets

POINTING DEVICE, DATA PROCESSING DEVICE, AND DATA PROCESSING SYSTEM

CROSS-REFERENCE TO RELATED APPLICATIONS

This application claims priority to Japanese Patent Application No. 2008-309410 filed on Dec. 4, 2008 and Japanese Patent Application No. 2009-270409 filed on Nov. 27, 2009. The entire disclosures of Japanese Patent Application Nos. 2008-309410 and 2009-270409 are hereby incorporated herein by reference.

BACKGROUND

1. Technical Field

The present invention relates to a pointing device (e.g., a pointing device having a three-dimensional motion sensor for detecting movement in space), a data processing device, and a data processing system (e.g., a menu selection system).

2. Related Art

Recently, there has been an increased need for a system that utilizes a pointing device for generating and outputting a physical quantity signal in accordance with the movement (including at least one of the orientation (including rotation and tilt) of a housing and the movement (including translational movement) of a housing) of a housing in space (e.g., a three-dimensional mouse).

Japanese Laid-Open Patent Publication No. 7-284166 and Japanese Laid-Open Patent Publication No. 2008-135075, for example, disclose techniques that utilize a button-operated device in which a cursor pointer is moved on an image display device by movement of a mobile device in three-dimensional space (a three-dimensional mouse).

SUMMARY

In a system that utilizes a pointing device for detecting three-dimensional movement (a menu selection system in this case), a user moves the pointing device in space, for example, thereby causing a cursor to move on a menu screen page, for example, and then operates an operation switch to select a single selection option from among a plurality of selection options.

The operation switch is, for example, a press-type switch (including both protruding and flat-surfaced switches, and switches attached to a side surface that are turned on by pressure and turned off by release of pressure). Since finger pressure is applied to the operation switch when the switch is operated, the housing sometimes moves slightly in space, and the cursor position thereby moves away from the desired selection option. There is generally somewhat of a time delay between the start of operation of the operation switch and the time that operation is actually detected.

Consequently, when the cursor position is offset from the desired position when the operation of the operation switch is actually detected, the wrong selection option (wrong menu) is selected by the misplaced cursor. In this type of situation, the pointing device becomes less convenient, and the reliability of the menu selection system is also reduced.

Examples of possible measures for addressing this problem include giving each selection option of the menu screen page a large area, employing a switch that requires minimal operating force, and specifically designing the arrangement of the operation button or the like or the function of the operation button or the like, but these measures have limited effectiveness and cannot be considered adequate from the perspective of reliably preventing wrong selection.

According to at least one aspect of the present invention, there can be provided, for example, a highly reliable data processing system (e.g., including a three-dimensional input device (pointing device) and a data processing device) that is capable of reliably preventing unintended selection due to shaking of the pointing device, through the use of an easily implemented method that does not increase hardware cost.

A data processing device according to one aspect includes a cursor position decision unit, a display control unit, a switch operation signal detection unit, a storage unit, an event generation unit, and an event execution unit. The cursor position decision unit is configured to decide a cursor position based on a physical quantity signal generated in accordance with movement of a pointing device in space and transmitted from the pointing device to the data processing device, and to output cursor position information. The display control unit is configured to display an image having a plurality of selection options and to display a cursor on the image based on the cursor position information outputted from the cursor position decision unit. The switch operation signal detection unit is configured to detect a switch operation signal generated by operation of an operation switch of the pointing device and transmitted from the pointing device to the data processing device. The storage unit is configured to store, for a predetermined period, at least one of the cursor position information outputted from the cursor position decision unit and event information according to one of the selection options located in the image at a position corresponding to the cursor position decided by the cursor position decision unit. The event generation unit is configured to generate an execution event a when a first switch operation signal is detected at a first timing by the switch operation signal detection unit indicating that a state of the operation switch has been changed from a first state to a second state. The event generation unit is configured to generate the execution event based on the at least one of the cursor position information and the event information stored in the storage unit at a second timing that is prior to the first timing. The event execution unit is configured to execute the execution event.

Unintended selection of a menu or the like is caused by the cursor position being shifted by shaking of the pointing device that accompanies operation of the operation switch during the delay period from the start of operation of the operation switch to the time that the operation is actually detected. Therefore, in the present aspect, when a first switch operation signal (e.g., switch-on detection signal) is detected at a first timing by the switch operation signal detection unit of the data processing device, an execution event to be executed is generated based on cursor position information or event information (i.e., selection information of the menu or the like in the state prior to shifting of the cursor position) corresponding to the cursor position of a second timing prior to the first timing. Through this configuration, even when the pointing device is slightly moved (shaken) due to operation of the operation switch, the execution event is generated based on the cursor position information of a time prior to the shaking, or based on an event (i.e., an event coordinated with the selection option at which the cursor was positioned prior to the shaking) that corresponds to the cursor position information. Consequently, no problems are caused by shaking of the pointing device, and the correct menu can be selected.

The term "operation switch" herein refers to a pushbutton switch, slide-type switch, or the like. These switches include both protruding switches and flat-surface switches. The operation switch includes a type of switch that is turned on by the pressure of a user's finger, for example, and turned off by releasing the pressure, and includes a switch that is provided to a main surface of the housing or a side surface of the housing. The term "event" refers to information (also referred to as a message) transmitted by a program when some action is generated during execution of a computer program. For example, processing (process data) to be executed by a program is specified by an event. The term "execution event" refers to an event to be actually executed, and an example thereof is an event (or process data thereof) possessing information for specifying processing that is to be executed by a program.

The data processing device according to claim 1, wherein

In another aspect of the data processing device, the storage unit may be configured to store the at least one of the cursor position information and the event information for the predetermined period that is equal to or longer than a delay period from a start timing of operation of the operation switch to a timing at which the state of the operation switch changes from the first state to the second state.

In the present aspect, at a minimum, event information or cursor position information for the amount of time corresponding to the delay period is stored in the storage unit in order to correct shifting of the cursor position in the delay period (switch operation delay period) that accompanies switch operation. For example, cursor position information (or event information corresponding to the cursor position information) from the cursor position decision circuit is stored at a certain time interval (e.g., every $1/60^{th}$ of a second in synchrony with the frame rate of a TV screen) in the storage unit. When the abovementioned delay period is designated as TE, the event generation unit generates an execution event based on the cursor position information or event information for a second time a time equal to the delay period TE prior to the first time.

Another aspect of the data processing device may includes a reading unit configured to readout the at least one of the cursor position information and the event information stored in the storage unit and to output the at least one of the cursor position information and the event information to the event generation unit.

In the present aspect, a reading unit is provided to read information from the storage unit. When a first switch operation signal (e.g., switch-on detection signal) is detected at a first time, for example, the reading unit reads the cursor position information or event information for a second time prior to the first time and feeds the read cursor position information or event information to the event generation unit.

In another aspect of the data processing device, the storage unit may include a delay line having a delay amount corresponding to the delay period, and the storage unit is configured to output the at least one of the cursor position information and the event information to the event generation unit.

In the present aspect, the storage unit is composed of a delay line (e.g., a shift register) having a delay amount that corresponds to the delay period described above. The cursor position information or event information inputted to the storage unit (delay line) is outputted from the storage unit (delay line) after an elapsed time that corresponds to the delay period described above. The event generation unit generates an execution event based on the cursor position information or event information received from the storage unit. In the present aspect, there is no need for a reading unit for reading the information from the storage unit. The circuit structure is thereby simplified.

A pointing device according to another aspect is adapted to send a physical quantity signal and a switch operation signal to a data processing device so that the data processing device generates an event corresponding to one of a plurality of selection options displayed in a display unit and executes the generated event based on the physical quantity signal and the switch operation signal received. The pointing device includes an operation switch, a delay circuit configured to delay the physical quantity signal generated in accordance with movement of the pointing device in space, and a transmission interface configured to transmit the physical quantity signal delayed by the delay circuit and the switch operation signal generated by operation of the operation switch to the data processing device.

In the present aspect, a delay circuit is provided to the pointing device. A delay corresponding to the abovementioned delay period is imparted to the physical quantity signal generated in response to movement of the pointing device in space, and the physical quantity signal after the delay is transmitted to the data processing device. The event generation unit of the data processing device generates an execution event based on the cursor position information or event information at the timing at which the first switch operation signal was detected. Since a delay is imparted at the pointing device to the physical quantity signal, the same effects as those described above are obtained. Specifically, even when the pointing device is slightly shaken due to operation of the operation switch, the execution event is generated based on the cursor position information of a time prior to the shaking, or based on an event that corresponds to the cursor position information. Consequently, no problems are caused by shaking of the pointing device, and the correct menu can be selected.

In another aspect of the pointing device, the delay circuit may be configured to delay the physical quantity signal by a predetermined period that corresponds to a delay period from a start timing of operation of the operation switch to a timing at which a state of the operation switch changes from a first state to a second state.

In the pointing device described above, the delay circuit preferably imparts to the physical quantity signal a delay corresponding to the delay period (switch operation delay period) that accompanies switch operation.

A data processing system according to another aspect includes the data processing device as described above, and the pointing device configured and arranged to transmit to the data processing device the physical quantity signal generated in accordance with movement of a housing in space, and the switch operation signal generated by operation of the operation switch provided to the housing.

A highly reliable data processing system can thereby be provided that is capable of reliably preventing unintended selection due to shaking of the pointing device.

A data processing system according to another aspect includes the pointing device as described above, and the data processing device configured to receive the physical quantity signal and the switch operation signal that are transmitted from the pointing device, to generate the execution event corresponding to one of the selection options displayed in the display unit by data processing based on the physical quantity signal and the switch operation signal received, and to execute the generated execution event.

A highly reliable data processing system can thereby be provided that is capable of reliably preventing unintended selection due to shaking of the pointing device.

According to at least one aspect of the present invention, a highly reliable data processing system (e.g., including a three-dimensional input device (pointing device) and a data processing device), for example, can be provided that is capable of reliably preventing unintended selection due to shaking of the pointing device, through the use of an easily implemented method that does not bring increased hardware cost.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will next be described with reference to the drawings. The embodiments described hereinafter do not limit the scope of the present invention described in the claims, and the configurations described in the embodiments are not necessarily essential as means of achieving the objects of the present invention.

First Embodiment

In the present embodiment, when an operation switch changes from the "off" state to the "on" state, an event to be executed (execution event) is generated based on cursor position information of a time that is a predetermined time prior to the turn-on detection time of the operation switch.

Example of Configuration and Operation of Menu Selection System

Figure 1:
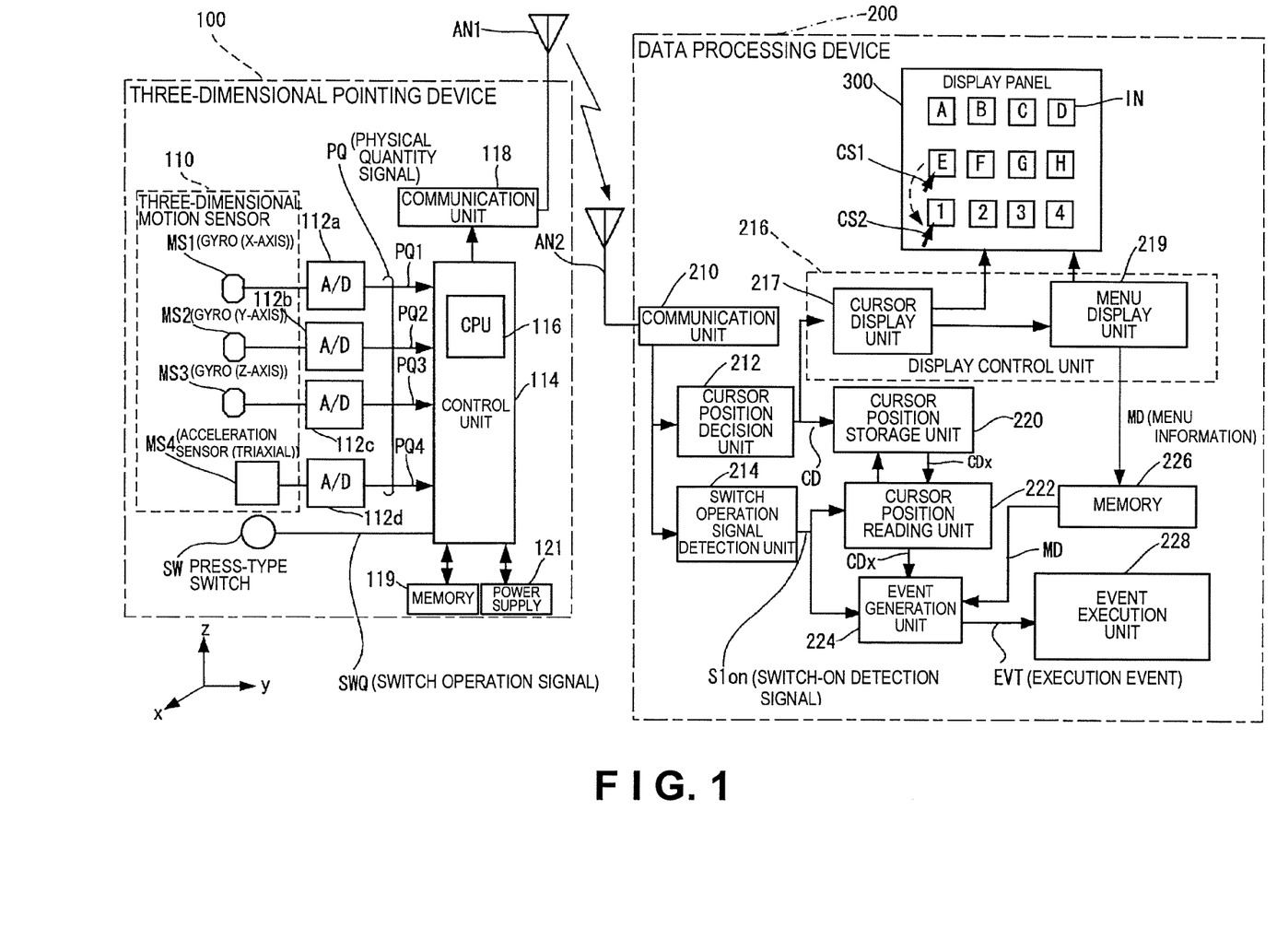
FIG. 1 is a view showing an example of the configuration of a menu selection system as an example of the data processing system.

FIG. 1 is a view showing an example of the configuration of a data processing system (in this instance, a menu selection system). The menu selection system shown in FIG. 1 includes a three-dimensional pointing device 100 and a data processing device 200. The three-dimensional pointing device is an input device having a function for generating a physical quantity signal in response to movement in space (e.g., at least one of orientation, rotation, and translation), and is a three-dimensional mouse, for example. The term "pointing device" refers to an input device in a computer system or the like, and is interpreted in the broadest sense (e.g., interpreted as being synonymous with an input device). The data processing device 200 is the main body of a computer, for example, and in the present embodiment, performs information processing (menu display processing, event execution, or the like) for enabling menu selection by a user.

The three-dimensional pointing device 100 and the data processing device 200 can transmit and receive information by communication (which may be wired communication or wireless communication, and infrared light, for example, may be used for wireless communication). In the menu selection system shown in FIG. 1, the three-dimensional pointing device 100 and the data processing device 200 are capable of exchanging information with each other by wireless communication via antennas AN1, AN2.

The three-dimensional pointing device 100 is capable of transmitting a physical quantity signal that is in accordance with the movement of a housing in space, and a switch operation signal generated by operation of the operation switch to the data processing device 200.

The three-dimensional pointing device 100 has a three-dimensional motion sensor 110. The three-dimensional motion sensor 110 has a first gyro sensor (angular speed sensor) MS1 for detecting angular speed about the x-axis, a second gyro sensor MS2 for detecting angular speed about the y-axis, a third gyro sensor MS3 for detecting angular speed about the z-axis, and a triaxial acceleration sensor (three-dimensional acceleration sensor) MS4 for detecting acceleration about each of the three axes (x-axis, y-axis, and z-axis).

The three-dimensional pointing device 100 has an operation switch (a press-type switch in this case) SW operated by a user; A/D converters 112a through 112d; a control unit 114 equipped with a CPU 116; a memory 119; a power supply 121; a communication unit (communication interface) 118; and an antenna AN1.

The three-dimensional motion sensor 110 detects angular speed and acceleration and outputs physical quantity signals that correspond to the detected physical quantities. The A/D converters 112a through 112c convert the analog angular speed signals outputted from the first gyro sensor MS1 through third gyro sensor MS3, respectively, into digital signals. The A/D converter 112d converts the analog acceleration signal outputted from the triaxial acceleration sensor MS4 into a digital signal. The A/D converters 112a through 112d output digital physical quantity signals PQ1 through PQ4 (the physical quantity signals are sometimes referred to collectively as physical quantity signals PQ), respectively, and the physical quantity signals PQ1 through PQ4 are fed to the control unit 114.

The press-type switch SW is a push-button switch, for example, and includes both protruding and flat-surfaced switches. The press-type switch SW switch includes a type of switch that is turned on by the pressure of a user's finger, for example, and turned off by releasing the pressure, and includes a switch that is provided to a main surface of the housing or a side surface of the housing. The "press-type switch" is an example of the operation switch, and is not limiting. Another example of the operation switch is a slide-type switch.

Since pressure is applied by a finger when the operation switch (press-type switch SW) is operated by the user, the housing sometimes moves in space slightly due to the effects of this pressure, and an unintended selection in a menu can occur due to this unwanted movement. Therefore, by specifically designing the data processing method in the data processing device 200 in the present embodiment, unintended menu selection due to unwanted movement of the three-dimensional pointing device 100 is reliably prevented.

Through data processing based on the received physical quantity signal and switch operation signal, the data processing device 200 generates an event that corresponds to a single selection option selected from among a plurality of selection options displayed by a display unit, and executes the generated event. The term "event" refers to information (also referred to as a message) transmitted by a program when some action is generated during execution of a computer program. For example, processing (processing details) to be executed by a program is specified by an event. The term "execution event" refers to an event to be executed, and an example thereof is an event (or processing details thereof) possessing information for specifying processing that is to be executed by a program.

The data processing device 200 includes a communication unit (communication interface) 210; a cursor position decision unit 212 for deciding the position of a cursor CS1 (CS2) and outputting cursor position information based on a received physical quantity signal; and a display control unit 216 for displaying a menu image having a plurality of selection options IN on a display panel 300 and displaying a cursor on the menu image based on the cursor position information outputted from the cursor position decision unit 212. Each of these components can be composed of a hardware circuit, for example. However, this configuration is not limiting, and each component may also be composed of a functional block implemented by a CPU and software, for example.

The cursor position decision unit 212 decides the position of the cursor CS1 (CS2) by, for example, performing an initialization process and a cursor position decision process as described below.

(Initialization Process) The cursor position decision unit 212 stores cursor position information corresponding to a prescribed initial position on the display panel 300 as initial cursor position information, and initially outputs the initial cursor position information. When the data processing device 200 is powered on, the cursor is displayed at the prescribed initial position (e.g., the center of the screen) on the display panel 300 according to the initial cursor position information. Even if the cursor has been moved to a position different from the prescribed initial position by turning on a prescribed switch or the like of the pointing device 100, the cursor is initially moved to the prescribed initial position. After that, the cursor position will be changed according to the physical quantity signal (output from the three dimensional motion sensor 110).

(Cursor Position Decision Process) After the cursor position decision unit 212 receives a prescribed switch-on signal from the pointing device 100, the cursor position decision unit 212 decides a new position for the cursor based on the physical quantity signal received from the pointing device 100 and the initial cursor position information. Then, the cursor position decision unit 212 outputs the new cursor position information.

For example, as processing of the physical quantity signal, the cursor position decision unit 212 obtains a first displacement vector by calculating a translation vector of the pointing device 100 based on the output signal from the triaxial acceleration sensor MS4, performing conversion processing to convert the translation vector to a projection vector on a prescribed plane, and multiplying the magnitude of the projection vector by a prescribed coefficient. Moreover, the cursor position decision unit 212 also obtains a second displacement vector by calculating rotation of the pointing device 100 based on the output signals from the gyro sensors M1, M2 and M3 of the three axes, converting the rotation into a translation vector of a prescribed end portion of the pointing device 100, performing conversion processing to convert the translation vector to a projection vector on the prescribed plane, and multiplying the magnitude of the projection vector by a prescribed coefficient. Then, for example, the following process (calculation) is performed to decide a new cursor position.

New Cursor Position=Initial Cursor Position+First Displacement Vector+Second Displacement Vector Moreover, if the new cursor position is determined to be outside of the display area of the display panel 300, then the new cursor position information is replaced by an edge position information corresponding to an edge position of the display area of the display panel 300.

The display control unit 216 includes a cursor display unit 217 and a menu display unit 219. In FIG. 1, a plurality of selection options IN (indicated in the drawing as A through H and 1 through 4) and a cursor CS1 (CS2) is displayed on the display panel 300. When cursor display is necessary, the cursor display unit 217 obtains cursor position information from the cursor position decision unit 212 and displays the cursor CS1 (CS2) on the display panel 300.

A plurality of events is coordinated on a 1:1 basis with the plurality of selection options IN (A through H, 1 through 4). For example, the currently displayed menu is a processing menu relating to a storage medium (e.g., CD ROM) or a hard disk of a computer system, selection option E, for example, is "copy (make a copy of) the information stored in the storage medium," and selection option 1 is "initialize the storage medium." In this case, the event "storage medium copy processing" is coordinated with selection option E, and the event "storage medium initialization processing" is coordinated with selection option 1.

The data processing device 200 also has a switch operation signal detection unit 214 for detecting the received switch operation signal; a cursor position storage unit 220 for storing the cursor position information outputted from the cursor position decision unit 212 or event information (i.e., event information coordinated with one of the plurality of selection options that is at the cursor position decided by the cursor position decision unit 212) for a predetermined time; a cursor position reading unit 222; a memory 226 for temporarily storing menu information MD; an event generation unit 224; and an event execution unit 228

The cursor position storage unit 220 temporarily stores the cursor position information CD outputted from the cursor position decision unit 212 at a certain time interval (every $1/60^{th}$ of a second in synchrony with the frame rate of a TV screen, for example). The cursor position storage unit 220 may be composed of a shift register, for example, or may be composed of a ring buffer that utilizes a memory element. The cursor position storage unit 220 can store for a period of one second, for example, the cursor position information (cursor position data) CD that is inputted every $1/60^{th}$ of a second. Using a certain timing as a reference (e.g., the timing that a switch-on detection signal S1*on* is outputted from the switch operation signal detection unit 214), the cursor position information for the previous one second can thereby be read from the cursor position storage unit 220.

When the press-type switch SW of the three-dimensional pointing device 100 changes from a first state (e.g., "off" state) to a second state (e.g., "on" state), the switch operation signal detection unit 214 detects this change, and outputs a switch-on detection signal S1*on* that is a first switch operation signal. The switch-on detection signal S1*on* is fed to each of the cursor position reading unit 222 and the event generation unit 224.

When the switch-on detection signal S1on is inputted at a first timing (e.g., timing t1), the cursor position reading unit 222 reads the cursor position information CD of a second timing (e.g., timing t0) prior to the first timing (e.g., timing t1) from the cursor position storage unit 220, and transmits the read cursor position information CDx to the event generation unit 224. The menu information MD displayed on the display panel 300 is stored in the memory 226. The menu information MD is fed to the event generation unit 224.

When the switch-on detection signal S1on from the switch operation signal detection unit 214 is inputted, the event generation unit 224, at the input timing, checks the menu information MD from the memory 226 and the cursor position information CDx read from the cursor position storage unit 220, specifies the selection option (event) that corresponds to the cursor position information CDx, and generates and outputs the event EVT that is coordinated with the specified selection option. The event EVT outputted from the event generation unit 224 is fed to the event execution unit 228 as an execution event (event to actually be executed).

The event execution unit 228 (an application program, for example) executes the necessary processing (processing for copying the information of the storage medium, for example) in accordance with the execution event EVT.

In the menu selection system of the present embodiment, unintended selection of a menu due to movement of the three-dimensional pointing device when the user operates the operation switch is reliably prevented.

Specifically, unintended selection of a menu is caused by the cursor position being shifted by shaking of the pointing device that accompanies operation of the press-type switch (operation switch) SW during the delay period from the start of operation of the press-type switch (operation switch) SW by the user to the timing that the operation is actually detected. Therefore, in the present embodiment, when the switch-on detection signal as the first switch operation signal is detected at a first timing by the switch operation signal detection unit 214 of the data processing device 200, an execution event to be executed is generated based on cursor position information or event information (i.e., menu selection information in the state prior to shifting of the cursor position) corresponding to the cursor position of a second timing prior to the first timing. Through this configuration, even when the pointing device is slightly moved (shaken) due to operation of the press-type switch (operation switch) SW, the execution event is generated based on the cursor position information of a time prior to the shaking. Consequently, no problems are caused by shaking of the pointing device, and the correct menu can be selected.

Considerations Regarding Switch Delay Period (Switch Margin Period)

The interval between the first timing at which the switch-on detection signal S1on is outputted and the second timing (past timing corresponding to the cursor position information to be read from the cursor position storage unit 220) prior to the first timing is preferably set to length of time that corresponds to the switch delay period (switch margin period) from the start of operation of the press-type switch (operation switch) SW provided to the three-dimensional pointing device 100 until depression of the press-type switch (operation switch) is actually detected, and this interval can be set to about 0.1 second to 0.2 second. The switch delay period (switch margin period) will next be described.

Figure 2:
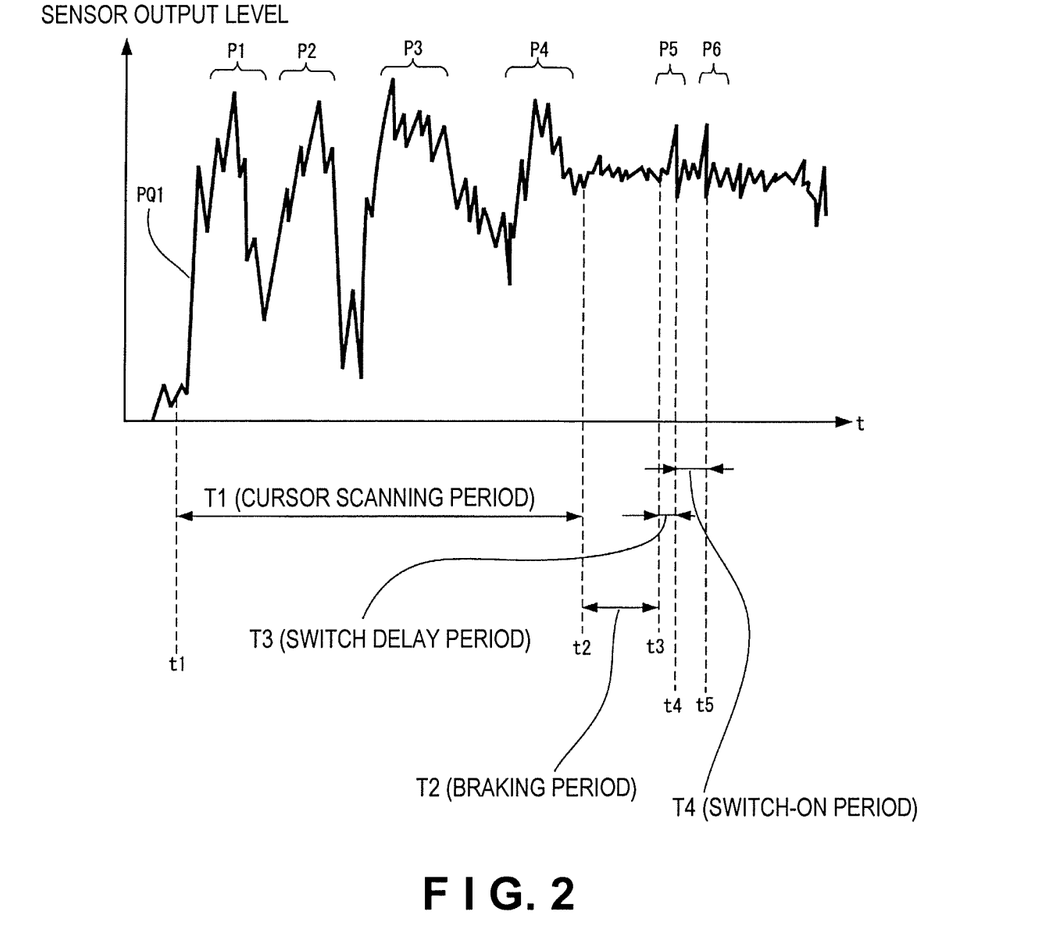
FIG. 2 is a view showing the relationship between the operation state of the press-type switch (operation switch) and the level of the physical quantity signal outputted from the three-dimensional motion sensor.

FIG. 2 is a view showing the relationship between the operation state of the press-type switch (operation switch) and the level of the physical quantity signal outputted from the three-dimensional motion sensor. In FIG. 2, the horizontal axis indicates the elapsed time (t), and the vertical axis indicates the signal level of the angular speed signal (physical quantity signal) PQ1 about the x-axis. In FIG. 2, P1 through P6 indicate peaks in the angular speed signal (physical quantity signal) PQ1.

In FIG. 2, period T1 (timing t1 to t2) is a cursor scanning period (period in which the user scans (moves) the cursor to make a menu selection). Period T2 (timing t2 to t3) is a braking period (period needed in order to stop movement of the cursor when the cursor has reached (or approached) the desired selection option). Period T3 (timing t3 to t4) is the switch delay period (the delay period from the start of operation of the press-type switch to actual detection of the operation; specifically, the period from the start of the switch-on operation until the contacts of the mechanical switch are on). Period T4 (timing t4 to t5) is a switch-on period (specifically, the period during which the contacts of the mechanical switch are on). The length of the switch delay period T3 is about 0.1 second to 0.2 second, for example.

In the cursor scanning period T1, the signal level of the angular speed signal (physical quantity signal) PQ1 changes significantly over time, and the peaks P1 through P4 occur. In the braking period T2, the amount of variation of the signal level of the angular speed signal (physical quantity signal) PQ1 decreases, and the signal level stabilizes. Pressing of the press-type switch (operation switch) SW starts at timing t3.

As is apparent from FIG. 2, in the switch delay period T3 from the timing (timing t3) at which the press-type switch SW begins to be turned "on" until the timing (timing t4) at which the contacts of the press-type switch SW are on, the signal level of the angular speed signal (physical quantity signal) PQ1 momentarily increases, and a peak P5 occurs. As described above, when the press-type switch SW is depressed, the "on" state does not immediately occur, but the contacts of the mechanical switch are connected to each other about 0.1 to 0.2 second after the start of depression, and the "on" state then occurs. The signal level of the angular speed signal (physical quantity signal) PQ1 momentarily increases when the press-type switch SW is released (timing t5) as well, and a peak P6 occurs. The period between the peak P5 and the peak P6 is the switch-on period T4.

A momentary significant change in the signal level of the angular speed signal (physical quantity signal) PQ1 is accompanied by a momentary significant change in the position of the cursor. At timing t4, the switch-on state is detected, but it is highly likely that the cursor at this timing (timing t4) is at the position that occurs subsequent to the momentary position change (an unintended cursor position), and the probability is high that the wrong processing will be executed if a menu selection is executed in this state. Therefore, the cursor position (past cursor position) of timing t3 prior to the momentary fluctuation of the cursor position is specified, and the execution event is generated based on the past cursor position information.

Operation Example

Figure 3A:
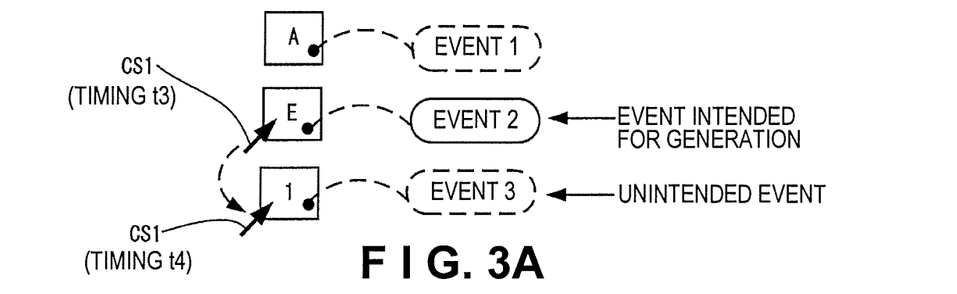
FIGS. 3A and 3B are views showing an example of the specific operation for event generation in the data processing device shown in FIG. 1.
Figure 3B:
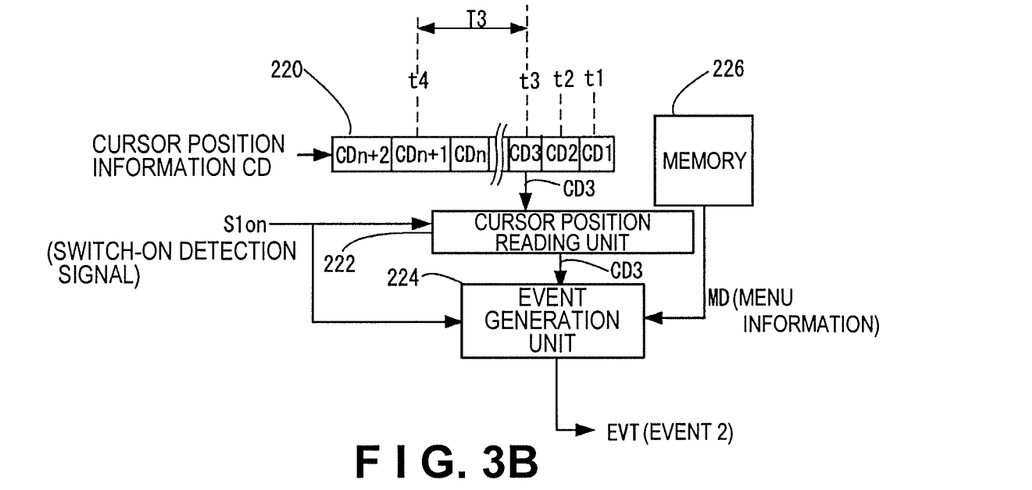

FIGS. 3A and 3B are views showing an example of the specific operation for event generation in the data processing device shown in FIG. 1. As shown in FIG. 3A, Event 1, Event 2, and Event 3 are coordinated on a 1:1 basis with selection options (A, E, 1) displayed on the display panel 300. For example, selection option E is a menu to "copy (make a copy of) the information stored in the storage medium," and selection option 1 is a menu to "initialize the storage medium." In this case, Event 2 of "storage medium copy processing" is coordinated with selection option E, and Event 3 of "storage medium initialization processing" is coordinated with selection option 1.

A case is supposed in which the cursor at timing t3 (prior to fluctuation of the cursor position) in FIG. 2 is CS1, and the cursor at timing t4 (after fluctuation of the cursor position) is CS2. In this case, regardless of the user's desire to execute Event 2, the unintended Event 3 is actually executed instead.

Therefore, in the present embodiment, the execution event to be executed is generated based on the cursor position information of the state prior to the shift in cursor position, as shown in FIG. 3B. Specifically, cursor position information of an amount of time corresponding to at least the abovementioned switch delay period T3 is stored in the cursor position storage unit 220. In the drawing, CD1 through CDn+2 each indicate cursor position information sampled every $\frac{1}{60}^{th}$ of a second that are stored in the cursor position storage unit 220.

When the switch-on detection signal S1*on* is outputted at timing t4, the cursor position reading unit 222 reads from the cursor position storage unit 220 the cursor position information CD3 of timing t3 occurring prior to timing t4 by an amount of time commensurate with the switch delay period T3, and transmits the cursor position information CD3 to the event generation unit 224. The menu information MD displayed on the display panel 300 is stored in the memory 226, and the menu information MD is automatically fed to the event generation unit 224.

When the switch-on detection signal S1*on* from the switch operation signal detection unit 214 is inputted, the event generation unit 224, at the input timing, checks the menu information MD from the memory 226 and the cursor position information CD read from the cursor position storage unit 220, specifies selection option E that corresponds to the cursor position information CD3, and generates and outputs the event EVT (i.e., Event 2) that is coordinated with the specified selection option E. The event EVT (Event 2) outputted from the event generation unit 224 is fed to the event execution unit 228 as the execution event (event to actually be executed). Event 2 of "storage medium copy processing" (the processing desired by the user), which is coordinated with selection option E, is thereby reliably executed.

Second Embodiment

Figure 4:
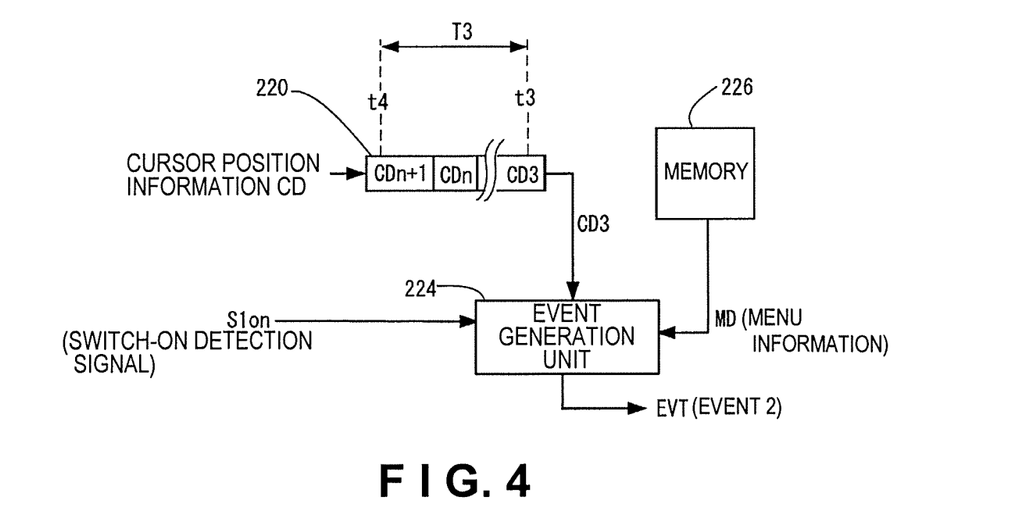
FIG. 4 is a view showing the configuration of another example (in which the cursor position storage unit is composed of a delay line) of the menu selection system.

FIG. 4 is a view showing the configuration of another example (in which the cursor position storage unit is composed of a delay line) of the menu selection system. In the present embodiment, the cursor position storage unit 220 is composed of a delay line (e.g., a shift register) having a delay amount that corresponds to the switch delay period T3.

In the present embodiment, the cursor position information CD inputted to the cursor position storage unit (which is a shift register in this case) 220 is outputted from the cursor position storage unit 220 after a time has elapsed that corresponds to the switch delay period T3.

The event generation unit 224 generates an execution event EVT (specifically, Event 2) based on the cursor position information CD3 (specifically, the cursor position information of timing t3) outputted from the cursor position storage unit 220.

In the present embodiment, there is no need for a cursor position reading unit (indicated by reference numeral 222 in FIG. 3) for reading the cursor position information from the cursor position storage unit 220. The circuit structure is thereby simplified.

Third Embodiment

In the previously described embodiments, an execution event is generated based on past cursor position information, but in the present embodiment, an execution event is generated based on an event coordinated on a 1:1 basis with a selection option that is determined by past cursor position information.

Specifically, in the previously described embodiments, a method is employed in which cursor position information is obtained, the obtained cursor position information is fed to the event execution unit, and an execution event that corresponds to the selection option is generated. In the present embodiment, however, a method is employed in which the event is found that is coordinated with the selection option (selection option positioned at the cursor position) specified by the cursor position information, the event information is sent to the event generation unit, and the event information as such is used as the execution event. The only point of difference between the methods described above is whether the execution event is generated based on the "cursor position info," or the execution event is generated based on "a tentative event that corresponds to the cursor position information." The method selected is determined at the design stage with consideration for the cost, the ease of configuring the circuits or software, and other factors. The cursor position information and the event information (tentative event information) that corresponds to the cursor position information are both "selection information as basic information relating to selection processing that can be used for predicting (or specifying) the selection results that are projected to occur if the operation switch is operated at a certain timing," and both types of information can therefore be referred to broadly as "selection information."

In the previously described embodiments, the cursor position information CD and the menu information MD are checked (compared) by the event generation unit 224, but in the present embodiment, checking (comparing) of the cursor position information CD and menu information MD is executed earlier, and the event (referred to as a tentative event) specified by the checking is stored in a tentative-event storage unit 52 for an amount of time that corresponds to at least the abovementioned switch delay period T3. The basic configuration of the data processing device is the same as in the first embodiment (FIG. 1). The "tentative event" is "an event coordinated with the selection option positioned at the cursor position, and is an event that has the potential to be selected, but that is in a state of not yet having been confirmed (i.e., a tentative event that would be confirmed as selected if the operation switch were to be pressed at that particular timing)," and is distinct from the "execution event" for which execution is definite.

Figure 5:
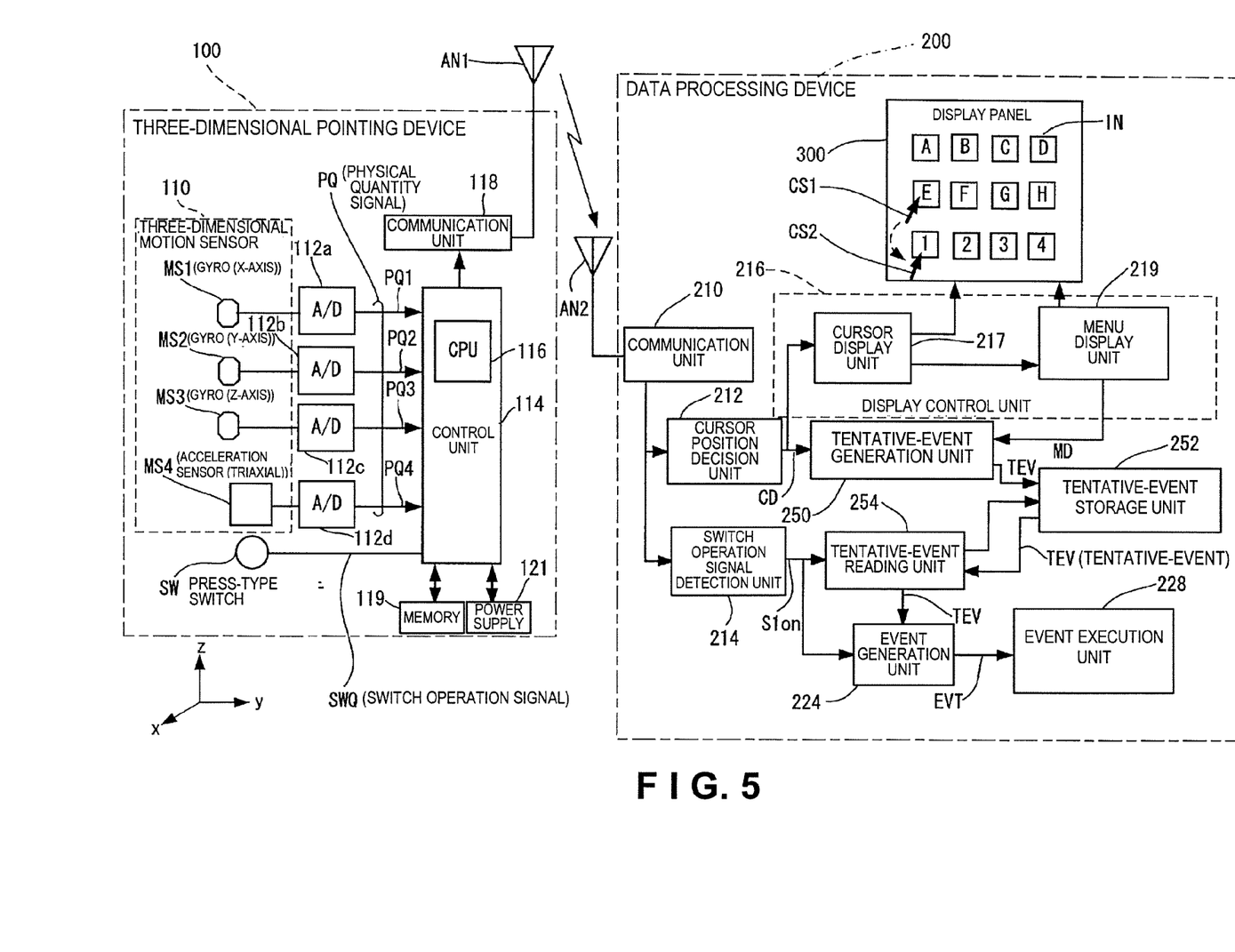
FIG. 5 is a view showing another example of the configuration of the menu selection system.

FIG. 5 is a view showing another example of the configuration of the menu selection system. In the data processing device 200 shown in FIG. 5, a tentative-event generation unit 250 is additionally provided, a tentative-event storage unit 252 is provided instead of the cursor position storage unit 220 of FIG. 1, and a tentative-event reading unit 254 is provided instead of the cursor position reading unit 222 of FIG. 1.

The tentative-event generation unit 250 checks (compares) the cursor position information CD outputted from the cursor position decision unit 212 and the menu information MD outputted from the menu display unit 219, and generates a tentative event TEV. The generated tentative event TEV is stored in the tentative-event storage unit 252. The tentative-event storage unit 252 stores the tentative event TEV for an amount of time that corresponds to at least the switch delay period T3. In actual practice, it is preferred that a tentative event TEV be acquired every $\frac{1}{60}^{th}$ of a second for approximately 1 second, and the acquired tentative events TEV be stored in sequence in the tentative-event storage unit 252.

When the switch-on detection signal S1*on* is outputted at a first timing (timing t4), the tentative-event reading unit 254 reads from the tentative-event storage unit 252 a tentative event TEV of the timing t3 that is prior to the timing t4 by an amount of time commensurate with the switch delay period T3 and transmits the tentative event TEV to the event generation unit 224.

When the switch-on detection signal S1*on* from the switch operation signal detection unit 214 is inputted, the event generation unit 224, at the input timing (timing t4), specifies the tentative event TEV fed from the tentative-event reading unit 254 as the execution event EVT without modification, and feeds the specified execution event EVT to the event execution unit 228. The result obtained is the same as the previously described embodiments.

Figure 6:
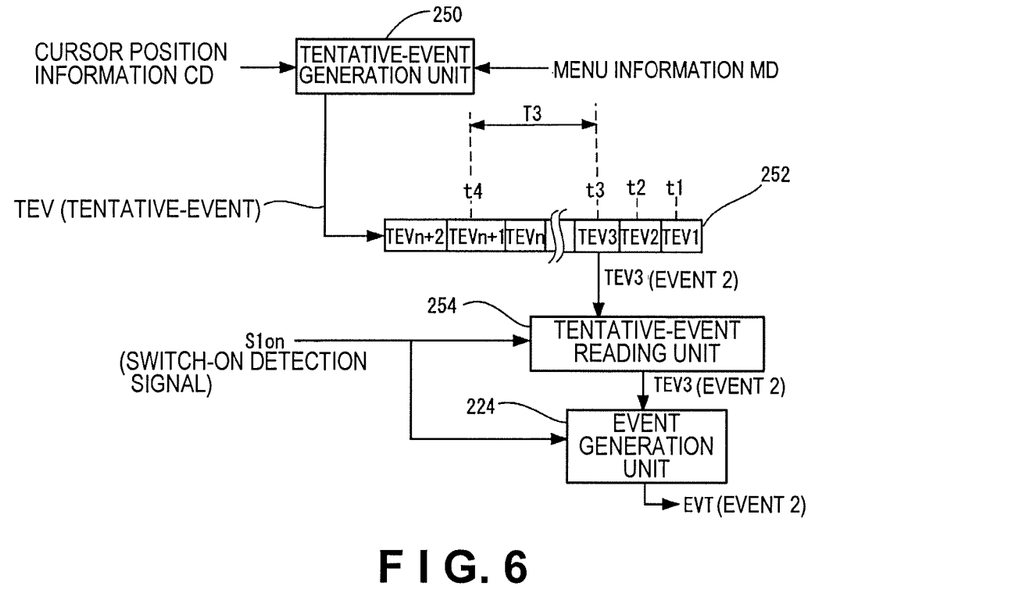
FIG. 6 is a view showing an example of the specific operation for event generation in the data processing device shown in FIG. 5.

FIG. 6 is a view showing an example of the specific operation for event generation in the data processing device shown in FIG. 5. Tentative events TEV1 through TEVn+2 are stored in the tentative-event storage unit 252. At timing t4, when the switch-on detection signal S1*on* is inputted to the tentative-event reading unit 254, a tentative event TEV2 for timing t3 that is prior to timing t4 by an amount of time corresponding to the switch delay period T3 is read by the tentative-event reading unit 254. The tentative event TEV2 corresponds to Event 2 shown in FIG. 3A, for example. The event generation unit 224 designates Event 2 as the execution event and transmits Event 2 to the event execution unit 228.

Moreover, when the cursor position storage unit 220 shown in FIG. 1 and the tentative-event storage unit 252 are both included in the data processing device 200, or when the cursor position information and the event information are both stored in a single storage unit, the event generation unit 224 can generate the execution event based on at least one of the cursor position information and the event information (the tentative-event information) stored at the second timing prior to the first timing.

Fourth Embodiment

Figure 7:
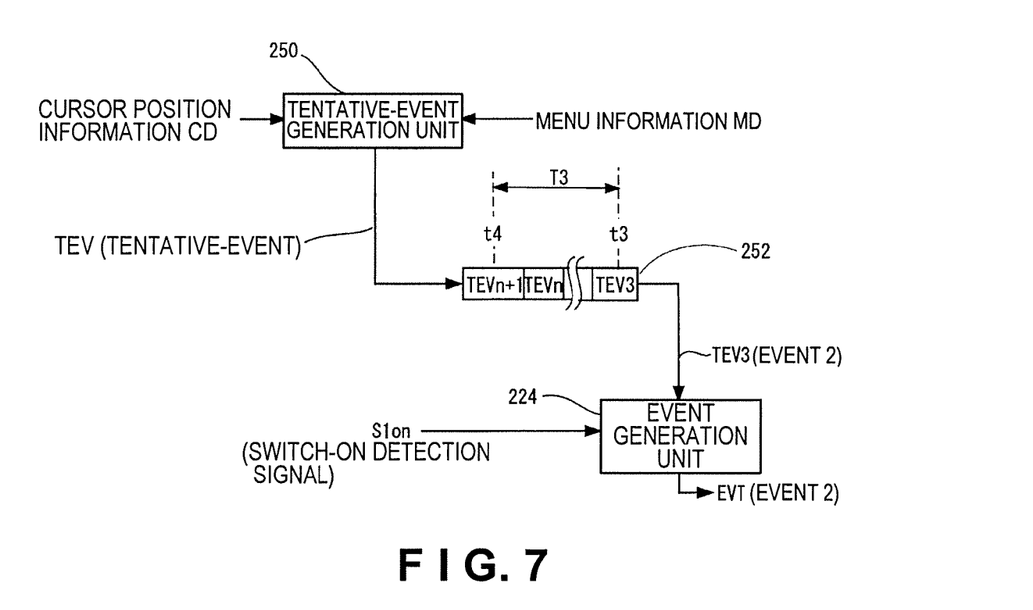
FIG. 7 is a view showing the configuration of another example (in which the tentative-event storage unit is composed of a delay line) of the menu selection system.

FIG. 7 is a view showing the configuration of another example (in which the tentative-event storage unit is composed of a delay line) of the menu selection system. In the present embodiment, the tentative-event storage unit 252 is composed of a delay line (e.g., a shift register) having a delay amount that corresponds to the switch delay period T3.

In the present embodiment, the tentative event TEV inputted to the tentative-event storage unit (which is a shift register in this case) 252 is outputted from the tentative-event storage unit 252 after a time has elapsed that corresponds to the switch delay period T3.

The event generation unit 224 specifies the tentative event TEV2 (specifically, Event 2 at timing t3) outputted from the tentative-event storage unit 252 as the execution event EVT at the timing (timing t4) at which the switch-on detection signal S1*on* is inputted, and transmits the execution event EVT to the event execution unit 228.

In the present embodiment, there is no need for a tentative-event reading unit (indicated by reference numeral 254 in FIG. 6) for reading the tentative event TEV from the tentative-event storage unit 252. The circuit structure is thereby simplified.

Fifth Embodiment

Figure 8:
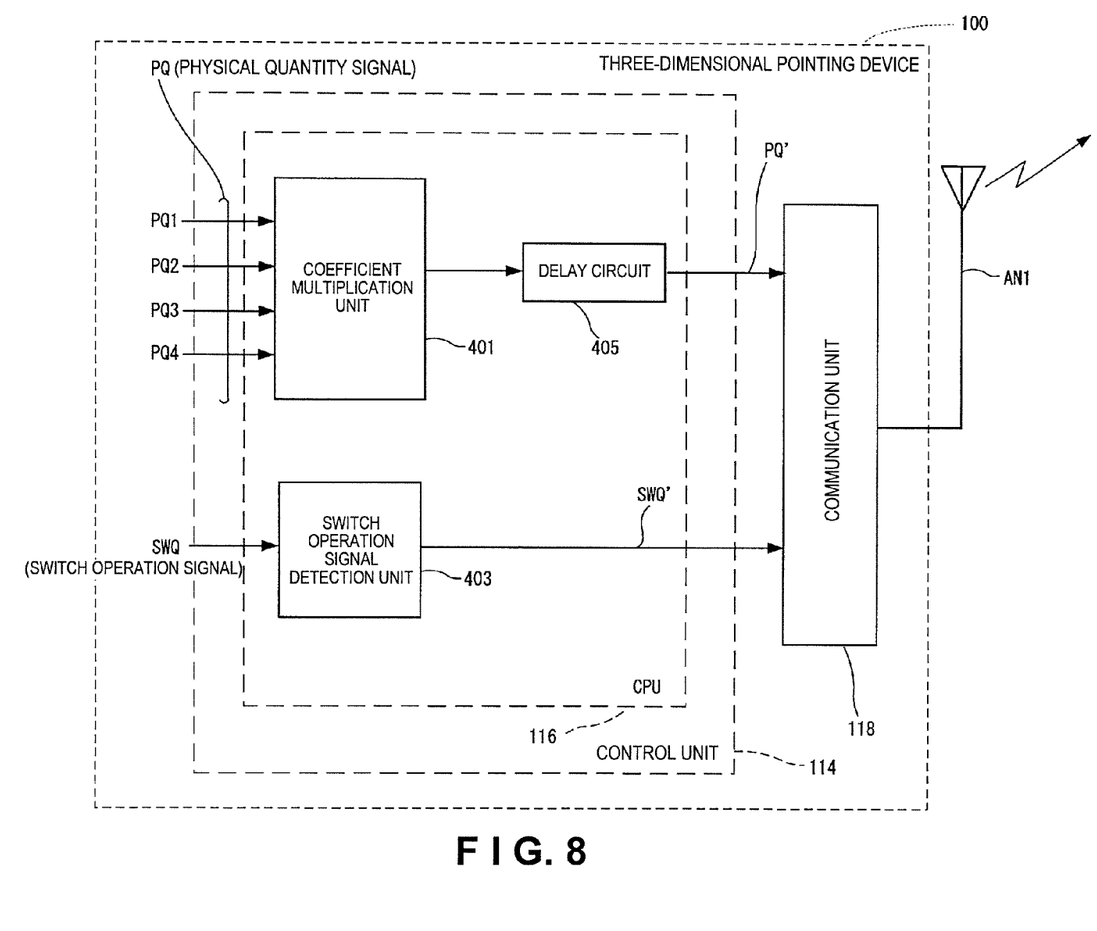
FIG. 8 is a view showing another example of the configuration of the pointing device used in the menu selection system as an example of the data processing system.

FIG. 8 is a view showing another example of the configuration of the pointing device used in the data processing system (menu selection system). In FIG. 8, the three-dimensional motion sensor 110, press-type switch SW, memory 119, and power supply 121 in the three-dimensional pointing device 100 shown in FIG. 1 are omitted. FIG. 8 shows an example of the configuration of functional blocks in the CPU 116 that is included in the control unit 114.

A coefficient multiplication unit 401 multiplies a coefficient for converting a minute displacement ΔPQ of the physical quantity signals PQ (PQ1 through PQ4) to the movement distance of the cursor on the display panel 300 by each of the physical quantity signals PQ1 through PQ4. A delay circuit 405 delays the physical quantity signals outputted from the coefficient multiplication unit 401 by an amount of time that corresponds to the abovementioned switch delay period.

A switch operation signal detection unit 403 detects a switch signal SWQ generated by depression and release (release) of the press-type switch (operation switch) SW and generates a switch operation signal (transmission side) SWQ'.

The communication unit (communication interface or transmission interface) 118 transmits by wireless communication, for example, the physical quantity signal delayed by the delay circuit 405, and the switch operation signal SWQ' generated by operation of the operation switch SW to the data processing device 200.

In the present embodiment, the delay circuit 405 is provided to the three-dimensional pointing device 100. A delay of an amount of time corresponding to the switch delay period T3 is preferably imparted to the physical quantity signal generated in response to movement of the three-dimensional pointing device 100 in space, and the delayed physical quantity signal is transmitted to the data processing device 200.

The event generation unit 224 of the data processing device 200 generates an execution event based on the cursor position information or event information of the timing at which the switch-on detection signal S1*on* as a first switch operation signal was detected by the switch operation signal detection unit 214. In the present embodiment, since a predetermined delay is imparted to the physical quantity signal at the three-dimensional pointing device 100, the same effects as those of the abovementioned embodiments are obtained.

Specifically, even when operation of the press-type switch (operation switch) SW causes the three-dimensional pointing device 100 to shake, the physical quantity signal transmitted when the shaking occurs is a physical quantity signal of a timing in the past for a prescribed amount of time (in other words, a physical quantity signal at a timing prior to the shaking). An execution event is thus generated by the data processing device 200 based on the cursor position information of the timing prior to when the three-dimensional pointing device 100 was shaken, or based on a tentative event that corresponds to the cursor position information. Consequently, no problems are caused by shaking of the pointing device, and the correct menu can be selected.

Through the embodiments of the present invention described above, since the effects of depressing a button, for example, can be eliminated, the area of each selection option can be made smaller without any problems, and a smaller-sized practical data processing system (e.g., menu selection system) can be constructed. The same real-time properties as those of the conventional technique can also be maintained in the display or movement of the cursor, and there is therefore no increase of stress on the user. The structure is also simplified and therefore easily implemented, and there is almost no added hardware cost, for example.

According to at least one embodiment of the present invention, a highly reliable menu selection system or other data processing system (e.g., including a three-dimensional input device (pointing device) and a data processing device), for example, can be provided that is capable of reliably preventing unintended selection due to shaking of the pointing device, through the use of an easily implemented method that does not bring increased hardware cost, for example.

Embodiments of the present invention are described in detail above, but it will be readily apparent to one skilled in the art that numerous modifications of the present invention are possible in a range that does not depart from the new matter and effects of the present invention. All such modifications are accordingly encompassed by the present invention. For example, a menu selection system was described as an example in the embodiments above, but the present invention can be broadly utilized for game operation of a game system that utilizes a three-dimensional input device, remote control in a remote operation system for a camera or robot, and in other applications. The term "pointing device" is interpreted in the broadest sense, and broadly encompasses input devices that are capable of inputting switch operation signals and physical quantity signals that correspond to spatial displacement. The configuration of the three-dimensional motion sensor is not limited by the embodiments described above, and other configurations may be adopted (for example, a configuration in which a magnetic sensor is included in addition to a gyro sensor and an acceleration sensor). The orientation and rotation of the pointing device, as well as movement (translation) of the pointing device are also included in spatial displacement. A pointing device for detecting one-dimensional or two-dimensional displacement is also included. Translation (horizontal movement, vertical movement, or other movement) of the pointing device can be computed by integrating the variation of the output of an acceleration sensor over time.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A data processing device comprising:
   a cursor position decision unit configured to decide a cursor position based on a physical quantity signal generated in accordance with movement of a pointing device in space and transmitted from the pointing device to the data processing device, and to output cursor position information;
   a display control unit configured to display an image having a plurality of selection options and to display a cursor on the image based on the cursor position information outputted from the cursor position decision unit;
   a switch operation signal detection unit configured to detect a switch operation signal generated by operation of an operation switch of the pointing device and transmitted from the pointing device to the data processing device;
   a storage unit configured to store, for a predetermined period, at least one of the cursor position information outputted from the cursor position decision unit and event information according to one of the selection options located in the image at a position corresponding to the cursor position detected by the cursor position decision unit;
   an event generation unit configured to generate an execution event when a first switch operation signal is detected at a first timing by the switch operation signal detection unit indicating that a state of the operation switch has been changed from a first state to a second state, the event generation unit being configured to generate the execution event based on the at least one of the cursor position information and the event information stored in the storage unit at a second timing that is prior to the first timing; and
   an event execution unit configured to execute the execution event.

2. The data processing device according to claim 1, wherein
   the storage unit is configured to store the at least one of the cursor position information and the event information for the predetermined period that is equal to or longer than a delay period from a start timing of operation of the operation switch to a timing at which the state of the operation switch changes from the first state to the second state.

3. The data processing device according to claim 1, further comprising
   a reading unit configured to readout the at least one of the cursor position information and the event information stored in the storage unit and to output the at least one of the cursor position information and the event information to the event generation unit.

4. The data processing device according to claim 2, wherein
   the storage unit includes a delay line having a delay amount corresponding to the delay period, and the storage unit is configured to output the at least one of the cursor position information and the event information to the event generation unit.

5. A pointing device adapted to send a physical quantity signal and a switch operation signal to a data processing device so that the data processing device generates an event corresponding to one of a plurality of selection options displayed in a display unit and executes the generated event based on the physical quantity signal and the switch operation signal received, the pointing device comprising:
   an operation switch;
   a delay circuit configured to delay the physical quantity signal generated in accordance with movement of the pointing device in space; and a transmission interface configured to transmit the physical quantity signal delayed by the delay circuit and the switch operation signal generated by operation of the operation switch to the data processing device.

6. The pointing device according to claim 5, wherein the delay circuit is configured to delay the physical quantity signal by a predetermined period that corresponds to a delay period from a start timing of operation of the operation switch to a timing at which a state of the operation switch changes from a first state to a second state.

7. A data processing system comprising:

the data processing device according to claim 1; and the pointing device configured and arranged to transmit to the data processing device the physical quantity signal generated in accordance with movement of a housing in space, and the switch operation signal generated by operation of the operation switch provided to the housing.

8. A data processing system comprising:

the pointing device according to claim 5; and the data processing device configured to receive the physical quantity signal and the switch operation signal that are transmitted from the pointing device, to generate the execution event corresponding to one of the selection options displayed in the display unit by data processing based on the physical quantity signal and the switch operation signal received, and to execute the generated execution event.

* * * * *